United States Patent [19]

Lu

[11] Patent Number: 5,019,095
[45] Date of Patent: May 28, 1991

[54] NIPPLE ASSEMBLY WITH ALARM BUZZER AND BODY TEMPERATURE INDICATOR

[76] Inventor: Jieh-Shan Lu, 56, Alley 115, Shing Her Lane, Jang Her Li, Nan Tour City, Taiwan

[21] Appl. No.: 574,104
[22] Filed: Aug. 29, 1990
[51] Int. Cl.⁵ ............................................. G01K 13/00
[52] U.S. Cl. ................... 606/234; 606/235; 374/151; 128/859
[58] Field of Search .................. 606/234, 235, 236; 374/151; 340/584, 585, 596; 128/859

[56] References Cited

U.S. PATENT DOCUMENTS

| | | | |
|---|---|---|---|
| 3,634,840 | 1/1972 | Wilkinson | 340/595 |
| 3,857,285 | 12/1974 | Athey et al. | 340/595 X |
| 3,913,402 | 10/1975 | Doyle | 606/234 X |

FOREIGN PATENT DOCUMENTS

| | | | |
|---|---|---|---|
| 0166069 | 1/1986 | European Pat. Off. | 374/151 |
| 0039434 | 4/1981 | Japan | 374/151 |

*Primary Examiner*—Danton D. DeMille
*Assistant Examiner*—Brian E. Hanlon
*Attorney, Agent, or Firm*—Bacon & Thomas

[57] ABSTRACT

A nipple assembly which monitors the body temperature of a baby through an IC board, a heat sensitive resistor and a heat conductive liquid to activate a battery operated buzzer when the temperature of the liquid reaches a warning level. A thermocouple winding operates a pointer for providing visual indication of the liquid temperature on a temperature scale plate.

1 Claim, 4 Drawing Sheets

NIPPLE ASSEMBLY WITH ALARM BUZZER AND BODY TEMPERATURE INDICATOR

BACKGROUND OF THE INVENTION

This invention relates to a nipple assembly, specifically a nipple assembly with an alarm buzzer and a body temperature indicator. Within this assembly is provided a liquid of good heat conductivity, such as distilled clean water, for transferring the heat from a baby's mouth. Also provided within the assembly are a body temperature thermometer and a heat sensitive resistor protruding into the liquid so that when the body temperature of the baby exceeds a predetermined upper limit, the resistor causes the alarm buzzer to issue an alarming sound. Thereby, the body temperature of the baby sucking the nipple of the assembly in accordance with the invention can be monitored to protect the baby from being harmed by excessive body temperature which can induce other undesirable or life threatening symptoms.

Small families are the primary constituting units of the modern society in which babies are usually cared for by young busy inexperienced parents or even by the person working for a day nursery. In these circumstances, the babies' body temperatures are often neglected by their parents or the person who take care of them. Especially in a day nursery, it is hard for the person who take care of the babies to know which baby is getting an overhigh temperature because he cannot let every baby to put a thermometer in its mouth all the time. This commonly existing problem in the modern society constitutes a potential risk to the health and life of the baby.

Accordingly, the primary object of the invention is to provide a nipple with a body temperature indicator for a baby's daily suction, in which nipple is sealingly filled with distilled clean water or any other appropriate liquid through which the heat from the baby's mouth can be transferred to a specific indicator so that the baby's parents or the person who cares for the baby can clearly observe the baby's fluctuation in body temperature.

Another object of the invention is to provide a nipple assembly with an alarm buzzer, in which assembly is provided a heat sensitive resistor in connection with the buzzer through an IC so that the buzzer will be energized and issue an alarming sound when the temperature of the liquid in the nipple assembly reaches a warning point.

BRIEF SUMMARY OF THE INVENTION

To achieve this object, a nipple assembly with an alarm buzzer and a body temperature indicator in accordance with the invention comprises a base, a case, a body temperature indicator, an IC board, a heat sensitive resistor, an alarm buzzer, a transparent convex cover, and a handle provided with a battery therein. The sealed space formed in the assembly is filled with a heat conductive liquid.

The case is formed as a pot-shaped thin shell with a central tube. At the open end of the pot is provided an inwardly extending circular flange. On the outer circumference of the case is provided a plurality of glue pits for accomodating a waterproof glue. In the upper shell portion of the case is provided a plurality of liquid guiding openings, and on the top of the shell portion is provided a plurality of projecting sheets.

The body temperature indicator comprises a heat sensing winding constituted by two metal sheets of different materials. One end of the winding is attached to the central tube and the other end is attached to one end of the axle which is inserted through the central tube and a central hole of a scale plate, and a pointer is attached to the other end of the axle protruding beyond the scale plate.

A scale plate is engaged with the circumferential flange at the open end of the case. To the inner surface of the plate is attached the IC board. A central hole is formed in the scale plate. The range of the scale on the plate is from +3° or +4° C. to −3° or −4° C. in relation to the babies' normal body temperature.

A circular waterproof plate of substantially the same size as the base is closely engaged with the inner circumference of the base. A heat conductive liquid is filled in the space between the waterproof plate and the base. The IC board is sealed within a waterproof film to avoid its forming a short circuit. Moreover, the wire in connection with the board is covered with enamel to achieve the waterproof effect.

When a baby sucks the nipple of the assembly, the heat in the baby's mouth can be transferred to the heat sensing winding immersed in the liquid, and the winding can rotate the axle together with the pointer so that the latter is rotated through an angle on the scale plate. Furthermore, when the heat conductive liquid reaches a predetermined warning temperature, a signal from the heat sensitive resistor is sent through the IC board to the alarm buzzer and the buzzer is energized and issues an alarming sound to attract the attention of the person who cares for the baby.

BRIEF DESCRIPTION OF THE DRAWINGS

A preferred embodiment of the invention will now be described by way of example and with reference to the accompanying drawings, in which.

DETAILED DESCRIPTION OF THE INVENTION

Figure 1:
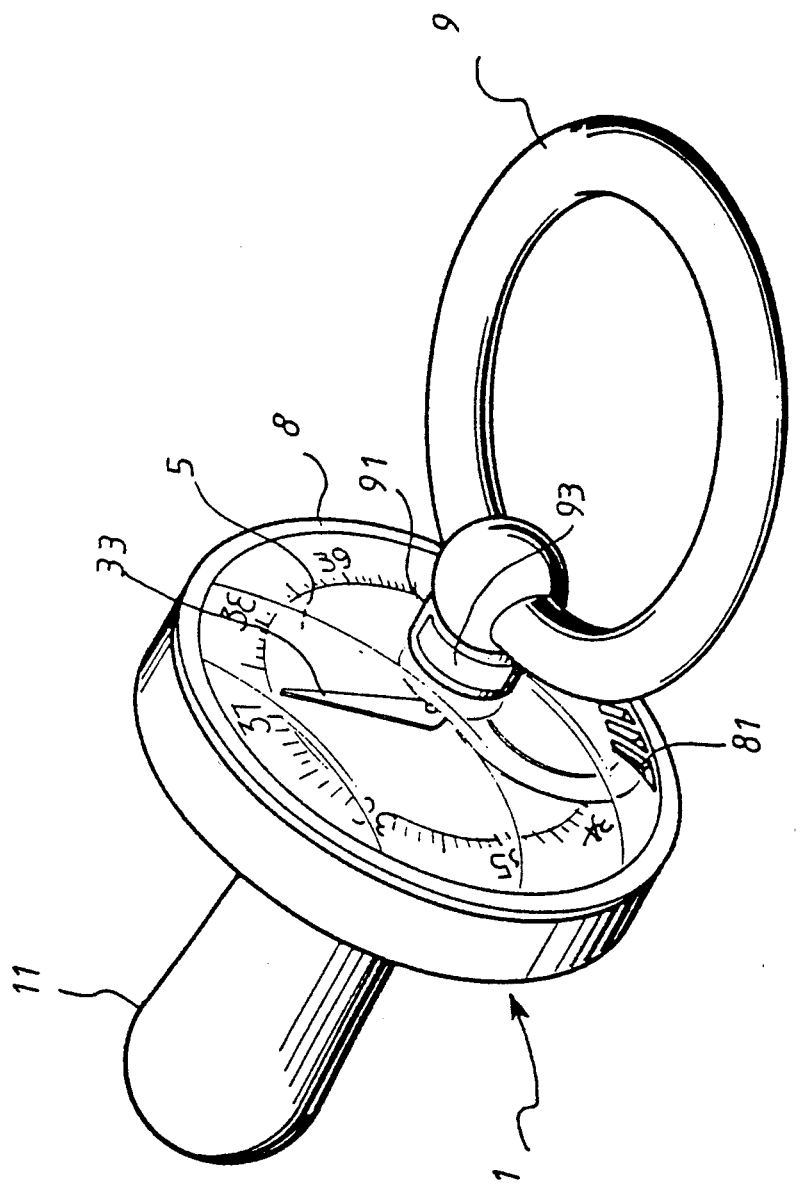
FIG. 1 is a perspective view of a nipple assembly in accordance with the invention.
Figure 2:
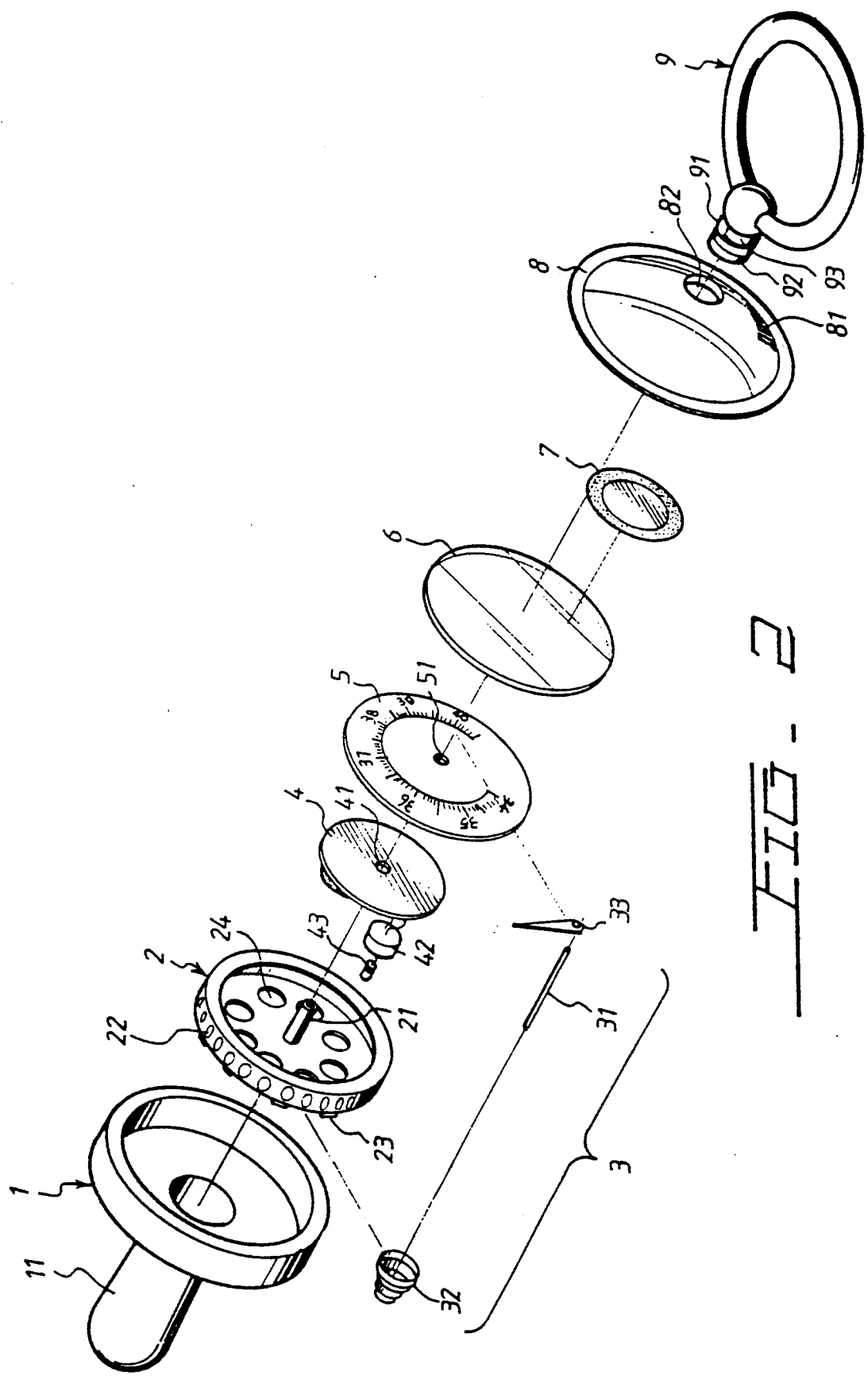
FIG. 2 is an exploded perspective view showing the nipple assembly in accordance with the invention.

Referring to FIGS. 1 and 2, a person who faces the baby sucking a nipple of the invention can clearly read the value indicated by the pointer 33 on the temperature scale 5 through the magnification effect of a transparent convex cover 8 mounted on the back of the base 1. Moreover, a plurality of sound releasing openings 81 is provided in the cover 8. When the body temperature of the baby reaches a warning point, a heat sensitive resistor 43 in a case 2 will become operative and consequently a buzzer 7 will issue an alarming sound through the openings 81.

Figure 3:
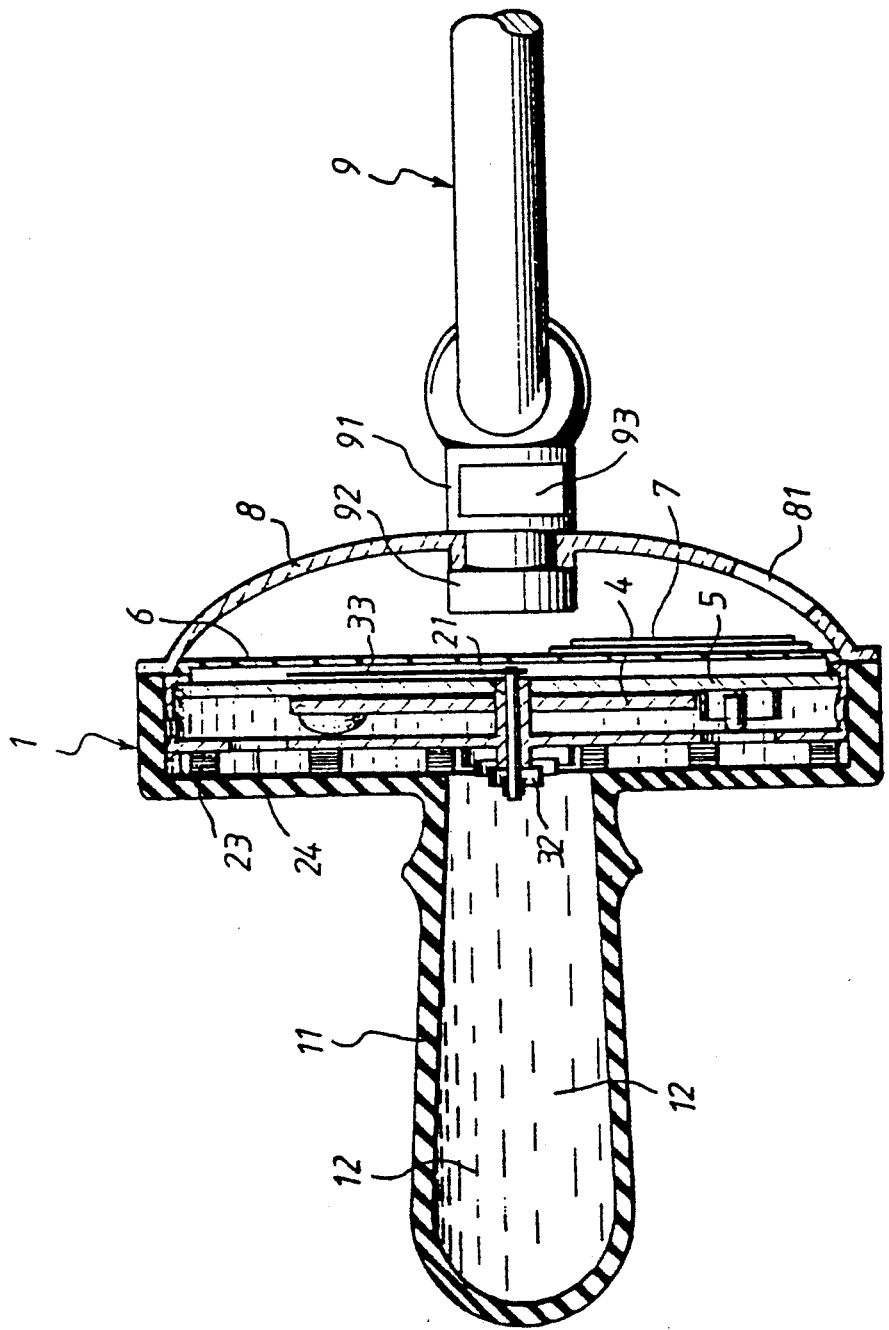
FIG. 3 is a longitudinal sectional view showing the assembly in its assembled state.

Referring to FIGS. 2 and 3, the nipple assembly comprises the following primary elements: a base 1 with a nipple 11 and a case 2. The base 1 is made of a pliable material of high density and has an opening on one side for receiving the case 2. The case 2 is formed as a disk-shaped thin shell with a central tube 21. On the circumference of the case 2 is provided a plurality of glue pits 22 for accommodating a waterproof glue. In the upper shell portion of the case 2 is provided a plurality of liquid guiding openings 24 and on the top of the shell portion is provided a plurality of projecting sheets 23.

A body temperature indicating device 3 comprises a heat sensing winding 32 constituted by two metal sheets of different materials. One end of the winding 32 is attached to the central tube 21 and the other end is attached to one end of the axle 31 which is inserted through the central tube 21 and a central hole 51 of a scale plate 5. A pointer 33 is attached to the other end of the axle 31.

A protection housing 42 and a heat sensitive resistor 43 is adhered to an IC board 4 which is formed with a hole 41 at the center thereof. The IC board 4 is adhered to the inner surface of the scale plate 5 which is engaged with the inner circumference of the case 2. Thereby, the IC board 4 and the components thereon are accommodated within the space defined by the scale plate 5 and the case 2. The range of the scale on the plate 5 may be, for example, from +3° C. to −3° C. relative to the baby's normal body temperature.

A circular waterproof plate 6 of substantially the same size as the base 1 is closely engaged with the inner circumference of the base 1 by the waterproof glue coated at the circumference of the plate. Thereby, the case 2, the IC board 4, the heat sensitive resistor 43, the scale plate 5, the heat sensing winding 32, the axle 31, and the pointer 33 are sealingly enclosed within the space between the waterproof plate 6 and the base 1. Moreover, a heat conductive liquid 12, such as a distilled clean water, is filled in the space. Thus, the IC board must be sealed within a waterproof film to avoid its forming a short circuit. Furthermore, the wire in connection with the board should be covered with enamel to achieve the waterproof effect.

An alarm buzzer 7 is disposed on the under side of the waterproof plate 6 at such a position so as not to shield the scale, and is in connection with the IC board 4.

A transparent cover 8 is adhered to the rear end of the base 1 to cover the above-mentioned components between the cover and the base. The cover 8 is formed into a covex disk shape so that it has a magnification function and is formed with an opening 82 at the center thereof. The cover is also formed with a plurality of sound releasing openings 81. A base 92 of a handle 9 can be engaged in the opening 82. The scale and pointer of the body temperature indicator 32 can be observed in their magnified state through the transparent convex cover 8.

The handle 9 can be formed in a ring or any other appropriate shape for holding by hand and is made of a pliable emulsion colloid. The handle 9 is attached with a battery seat 91. A mercury battery or any other small battery 93 can be disposed within the seat 91. Adjacent the seat 91 is an engaging base 92 which can be pressed and retained in the opening 82. The battery 93 supplies the electric energy required by the heat sensitive resistor 43 and the alarm buzzer 7.

A liquid 12 of good heat conductivity can be filled within the sealed space between the base 1 and the waterproof plate 6 so that heat can be transferred from the mouth of the baby through the nipple 11 of the base 1 to the liquid 12 within the nipple 11. When the nipple 11 is sucked and pressed by the baby's mouth, the liquid therein will flow in the sealed space by passing through the liquid guiding openings 24 and thus the heat in the liquid can be transferred to the heat sensing winding 32 immersed in the liquid. Since the winding 32 is made of two sheets of metals having different coefficients of thermal expansion, winding 32 thus forms a thermocouple. When subjected to heat, winding 32 can rotate the axle 31 which passes, in the central tube 21, through the central hole 41 in the IC board 4 and through the central hole 51 in the scale plate 5. A pointer 33 is attached to the protruding end of the axle 31. Thereby, when the axle 31 is rotated through an angle, the pointer 33 will correspondingly point to a specific value on the scale plate 5.

Figure 4:
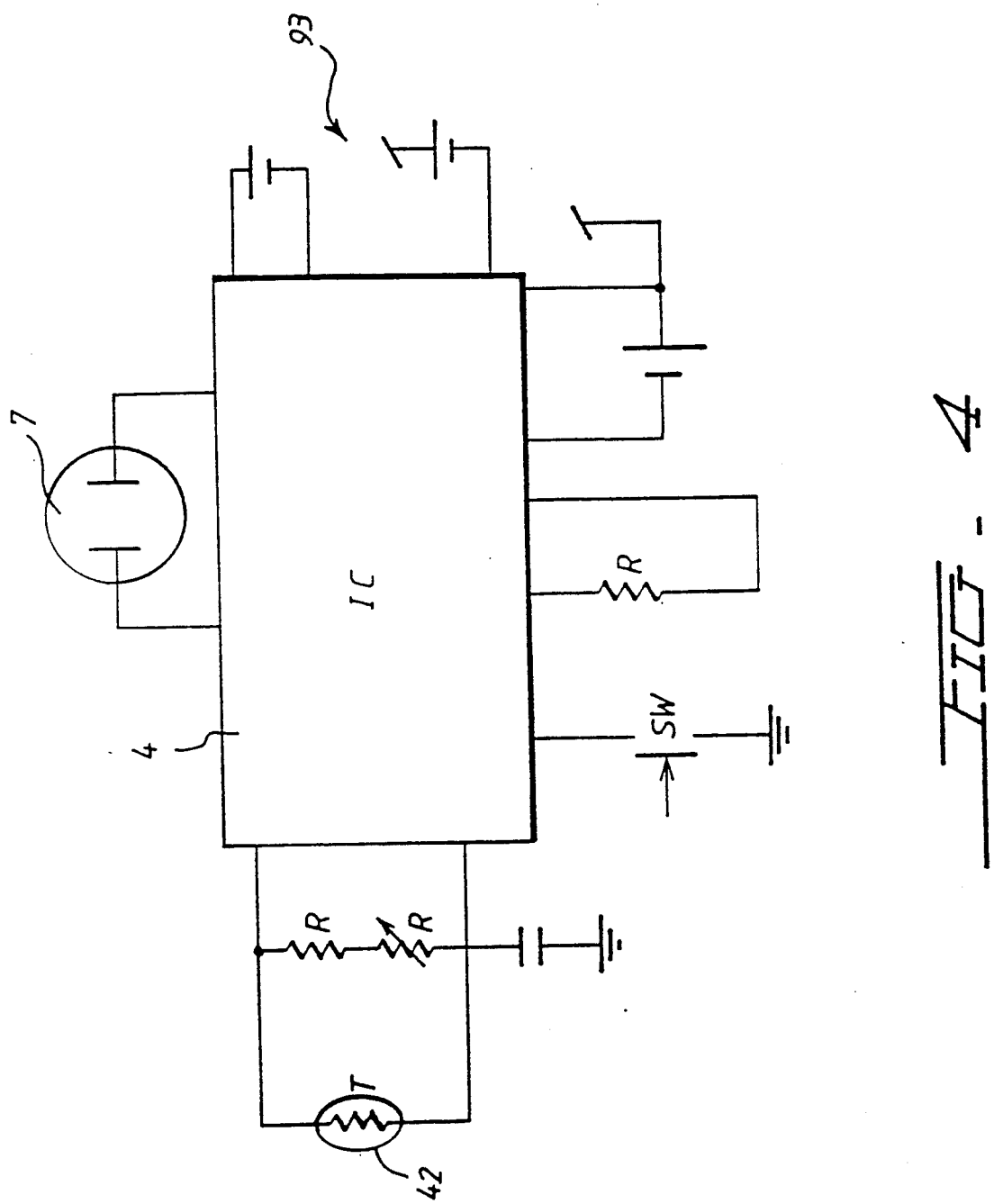
FIG. 4 is a schematic view showing the circuit used in the assembly in accordance with the invention.

Furthermore, when the heat coductive liquid 12 reaches a predetermined warning temperature, a signal from the heat sensitive resistor 42 will be sent through the IC board 4 to the alarm buzzer 7. Thus, the buzzer 7 is energized and issues a sound through the sound releasing openings 81 in the convex cover 8 to attract the attention of the person who cares for the baby. The circuit in accordance with the invention is schematically shown in FIG. 4.

While only one preferred embodiment of the invention has been shown and described, it will be understood that this invention is not limited thereto since modifications can be made and will become apparent to those skilled in the art.

I claim:

1. A nipple assembly comprising:
   (a) a hollow base provided with a nipple and including an opening on one side of the base;
   (b) a thin shell pot-shaped case having an open end and an inwardly extending circular flange, the case including a central tube, a plurality of glue pits formed on an outer circumference of the flange for receiving waterproof glue to attach the case to the base, upper shell portion provided with a plurality of liquid openings and a plurality of projecting sheets to permit liquid flow through the liquid openings;
   (c) a body temperature indicator including a heat sensing winding formed by two metal sheets of different materials, one end of the winding being secured to the central tube, an axle inserted through the central tube, another end of the winding being secured to one end of the axle, a scale plate having temperature scale readings thereon and provided with a central hole therethrough, the axle being disposed through the central hole, a pointer secured to another end of the axle extending beyond the scale plate for providing scale readings and the scale plate being engaged with the circular flange at the open end of the case,
   (e) a heat sensitive resistor;
   (f) a circular waterproof plate of substantially the same size as the base and secured thereto by waterproof glue around the circumference of the plate to define a space between the plate and the base, the IC board, heat sensitive resistor, scale plate, heat sensing winding, axle and pointer being sealingly enclosed within the space, and the space being filled with a heat conductive liquid;
   (g) an alarm buzzer, an energy source for powering the alarm buzzer, whereby when the temperature of the heat conductive liquid reaches a predetermined level, a signal from the heat sensitive resistor is sent through the IC board to activate the alarm buzzer and provide a warning to a person caring for a baby using the nipple assembly.

* * * * *